(12) United States Patent
Hollinger

(10) Patent No.: US 7,146,443 B2
(45) Date of Patent: Dec. 5, 2006

(54) INSTRUCTION ENCODING METHOD FOR SINGLE WIRE SERIAL COMMUNICATIONS

(75) Inventor: Joseph Hollinger, San Francisco, CA (US)

(73) Assignee: Advanced Analogic Technologies, Inc., Sunnyvale, CA (US)

( * ) Notice: Subject to any disclaimer, the term of this patent is extended or adjusted under 35 U.S.C. 154(b) by 211 days.

(21) Appl. No.: 11/021,398

(22) Filed: Dec. 23, 2004

(65) Prior Publication Data

US 2006/0143346 A1   Jun. 29, 2006

(51) Int. Cl.
 *G06F 13/42*   (2006.01)
(52) U.S. Cl. ...................................... 710/106; 713/500
(58) Field of Classification Search ................ 713/500; 710/105–106
See application file for complete search history.

(56) References Cited

U.S. PATENT DOCUMENTS 4,936,142 A * 6/1990 Davidson ..................... 73/179
2003/0212918 A1* 11/2003 D'Angelo et al. .......... 713/500

* cited by examiner

*Primary Examiner*—Rehana Perveen
*Assistant Examiner*—Clifford Knoll
(74) *Attorney, Agent, or Firm*—Joseph K. Hollinger

(57) ABSTRACT

An instruction encoding method is provided for communication between devices. Before transmission, each opcode is multiplied by two. Each operand is multiplied by two and incremented by one. Encoded opcodes and operands are sent as rising edges (i.e., voltage transitions) on a single wire connecting transmitting and receiving devices. The receiving device counts the rising edges to form a total. Even totals correspond to opcodes, odd totals correspond to operands.

7 Claims, 2 Drawing Sheets

INSTRUCTION ENCODING METHOD FOR SINGLE WIRE SERIAL COMMUNICATIONS

BACKGROUND OF THE INVENTION

U.S. patent application Ser. No. 10/144,333 (incorporated in this document by reference) describes a single wire serial interface for power control and other devices. For this protocol, a master device uses a single wire to communicate with a slave device. To send a command to the slave, the master device toggles the voltage on the serial line. The slave counts the number of voltage transitions on the serial line and enters an operational state that corresponds to that number. The master device can then cause the device to maintain its operational state by holding the voltage on the serial line high. Alternately, by holding the voltage low for a predetermined timeout period, the master causes the slave device to reset.

As an example, consider an LED driver that supports 64 levels of brightness as well as an off state. To control a device of this type using the single wire serial interface, a master device would choose the brightness level desired and cause the voltage on the serial line to toggle that many times. Toggling the voltage 39 times would, for example, select the $39^{th}$ brightness level. Holding the serial line high would cause the previously defined brightness level to be maintained. Holding the serial line low would cause the LED driver to turn the LED off.

U.S. patent application Ser. No. 10/447,764 (incorporated in this document by reference) extends the single wire serial protocol to include addressing and input-output capabilities. Addressing is used where the slave device includes several registers or addresses. To write a value into one of these registers, the master device uses the single wire serial protocol to send a register address. The master device then sends the data that is to be written into the selected register. Address and data are distinguished by the number of bits used to encode each: all sequences of more than n bits (where n is a predefined number) are treated as addresses. All sequences of n or fewer bits are treated as data.

As described in the same document, input-output operations allow slave devices to send data to master devices. To support input-output operations, a slave device is configured to recognize one or more predefined register addresses. A message that corresponds to one of the predefined addresses instructs the slave device to return the contents of a corresponding register. The slave device responds by using the single wire serial protocol to encode and send the register contents.

SUMMARY OF THE INVENTION

The present invention provides an instruction encoding method for single wire serial communications. The encoding method is typically deployed in a system where a master device (such as a microprocessor) is connected to a slave device (such as a power control IC) using a single wire. The wire is used to transmit a signal referred to as the EN/SET signal. The master device and slave devices send information by toggling the voltage level of the EN/SET signal. Each rising edge of the EN/SET signal is counted by the receiving device to form a total. The receiving device stops counting and forms a total when the transmitting device holds the EN/SET signal high for longer than a predetermined timeout period.

Each even number received by a device corresponds to an operation code. Each odd number corresponds to an operand. This receiving device examines the least significant bit of each received number to distinguish between operation codes and operands. The remaining more significant bits are then used as the operation code or operand. The sending device generates the even/odd encoding by multiplying (left shifting) each operation code and operand by two. The sending device then increments (adds one) to each operand.

For a typical implementation, the slave device includes a series of registers. To write a value into a register, the master device sends the address of the register, followed by the data that is to be written into the register. The register address is the operation code and the data is the operand. For example, to write the value seven into the fifth register, the master device sends the number ten (2*5), followed by the number fifteen (2*7+1).

A second instruction encoding method for single wire serial communication is also provided. For the second method, every other number is a type. Each type tells the receiving device how to interpret the following number. To illustrate, consider an implementation designed to support the transmission of operation codes and operands. In this type of implementation, two types would be defined: one for operation codes and one for operands. Assume these two types are the numbers one and two respectively. In such a case, the sending device would transmit the number one before sending any operation code and the number two before sending any operand. The receiving device would examine the type (one or two) to distinguish between operation codes and operands. A similar system can also be implemented where each type applies to the immediately preceding number.

DETAILED DESCRIPTION OF THE PREFERRED EMBODIMENTS

The present invention provides an instruction encoding method for single wire serial communications. The encoding method is typically deployed in a system where a master device (such as a microprocessor) is connected to a slave device (such as a power control IC) using a single wire. The wire is used to transmit a signal referred to as the EN/SET signal. The master device and slave devices send information by toggling the voltage level of the EN/SET signal. Each rising edge of the EN/SET signal is counted by the receiving device to form a total. The receiving device stops counting and forms a total where the transmitting device holds the EN/SET signal high for longer than a predetermined timeout period.

Two types of numbers are sent and received using the EN/SET signal: operation codes (opcodes) and operands. Opcodes are transmitted as even numbers and operands are transmitted as odd numbers. To transmit an opcode, the sending device first encodes that number as an even number. This is done by multiplying or left shifting the number by two. Algebraically, the opcode m is encoded for transmission as 2*m. To transmit an operand, the sending device first encodes that number as an odd number. This is done by multiplying or left shifting the number by two and adding one. Algebraically, the operand n is encoded for transmission as 2*n+1. This receiving device examines the least significant bit of each received number to distinguish between operation codes and operands. The remaining more significant bits are then used as the operation code or operand.

For the purposes of description, this document uses the number M to refer to the largest opcode used within an implementation of the instruction encoding method. As an example, consider a slave device that supports a total of sixteen opcodes. Typically, these would be numbered one through sixteen with the largest being sixteen. For that implementation M is equal to 16. Similarly, the number N is used to refer to the largest operand that may be used within an implementation. The largest encoded opcode and operand are 2*M and 2*N+1, respectively.

Figure 1:
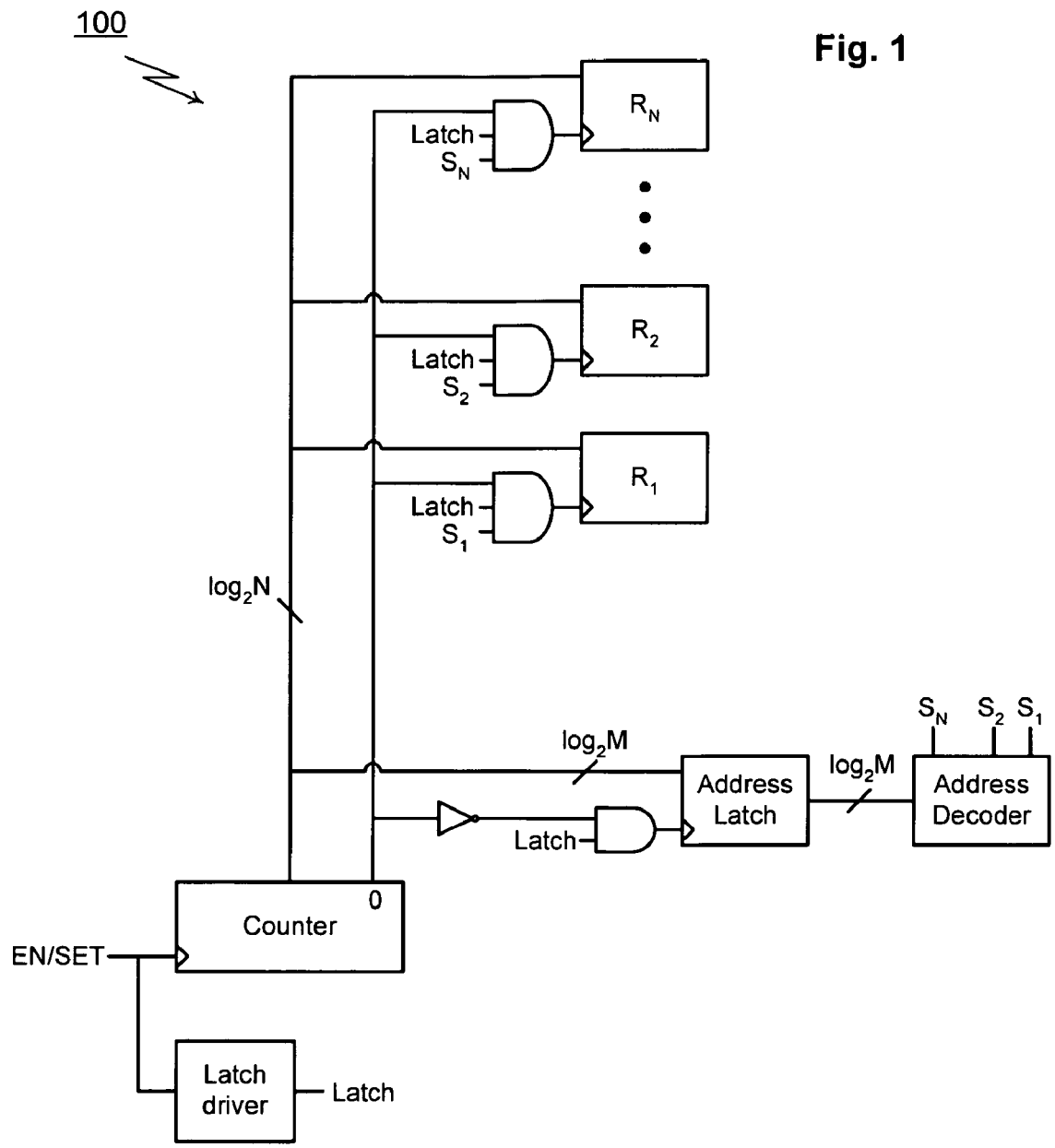
FIG. 1 is a block diagram showing a circuit that implements the instruction encoding method provided by the present invention.

FIG. 1 shows a block diagram of circuit 100 that implements the instruction encoding method for single wire serial communications. As shown in that figure, circuit 100 includes a counter and a latch driver both connected to receive the EN/SET signal. The counter keeps a running count of the number of rising edges that it receives. To prevent overflow, the counter is configured to hold the larger of 2*M (the largest encoded opcode) and 2*N+1 (the largest encoded operand). This requires a total of $\log_2(2M)$ or $\log_2(2N+1)$ bits (depending on weather M or N is greater).

The latch driver detects the period following each series of rising edges in which the EN/SET signal is held high for longer than a predetermined timeout period. In other words, the latch driver detects the end of transmission of each number (opcode or operand). At this point the latch driver asserts the "latch" signal.

The effect of the latch signal depends on the state of the least significant bit (bit zero) in the counter. If bit zero is zero, then the counter contains an encoded opcode (and not an encoded operand). For this reason, the $\log_2(2M)$ bits corresponding to the decoded opcode are sent to an address latch. It should be noted that bit zero is not sent. As a result, the opcode is implicitly right shifted by one (or divided by two) and returned to its un-encoded form.

Alternately, if bit zero of the counter is one, then the counter contains an encoded operand (and not an encoded opcode). For this reason, the $\log_2(2N+1)$ bits corresponding to the decoded operand are sent to a register. It should be noted that bit zero is not sent. As a result, the operand is implicitly right shifted by one (or divided by two) and returned to its un-encoded form. The destination register is chosen by an address decoder. The address decoder selects the destination register based on the contents of the address register. In effect, this means that the operand is stored based on a register selected by the last opcode.

For some implementations, it may be important to note that access to the numerically small addresses requires relatively few transitions of the EN/SET signal while numerically greater addresses require more transitions. Thus, access to register one would typically be faster than access to register fifteen. As a result, where speed is important it may be beneficial to arrange slave registers in order of decreasing likelihood of access.

The circuit of FIG. 1 implements a state machine in which each received opcode selects a destination register. All subsequent operands are stored in that register until another opcode is received and a new destination register is selected. It should be appreciated that there does not have to be a one to one mapping between opcodes and registers. For example, additional opcodes may be used to perform other operations such as a reset opcode that causes the slave device to initialize itself. Additional opcodes could also instruct the slave device to return the contents of a selected register. For one such implementation, each register would have both a read and a write address (opcode). It should also be noted that the even/odd classification is only one possibility. By using additional low order bits, the opcode/operand classification can be extended to any number of different instruction or data types.

Figure 2A:
FIG. 2A is a block diagram showing an alternating series of numbers and types as used by an embodiment of an instruction encoding method of the present invention.
Figure 2B:
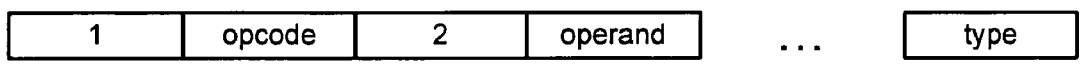
FIG. 2B is a block diagram showing an alternating series of opcodes, operands and types as used by an embodiment of an instruction encoding method of the present invention.

A second instruction encoding method for single wire serial communication is also provided. For the second method, every other number is a type. This is shown, for example, in FIG. 2A. Each type is itself a number (typically a small integer) transmitted using the EN/SET signal. Each type tells the receiving device how to interpret the following number. For example, FIG. 2B shows the transmission of an opcode and an operand. Both opcode and operand are preceded by corresponding types. In this case, the number one is the type used to indicate opcodes. The number two is the type used to indicate operands. When a device receives the number (type) one it treats the next received number as an opcode. When a device receives the number (type) two it treats the next received number as an operand.

The use of the numbers one and two is somewhat arbitrary-other numbers can also be used. Any number of different types may also be used. A similar system can also be implemented where each type applies to the immediately preceding number (instead of the immediately following number).

What is claimed is:

1. A method for controlling a device, the method comprising:
    encoding an opcode m as the value 2m;
    encoding an operand n as the value 2n+1;
    controlling the voltage on a serial line to send the encoded opcode as a series 2m of rising edges; and
    controlling the voltage on a serial line to send the encoded operand as a series 2n+1 of rising edges.

2. A method as recited in claim 1 in which the opcode corresponds to an address within the device.

3. A method for controlling a device, the method comprising:
    counting a series of rising edges in a serial input to form a total;
    extracting an operand from the total when the total is odd where the operand is numerically equal to the total shifted right by one bit; and
    extracting an opcode from the total when the total is even where the opcode is numerically equal to the total shifted right by one bit.

4. A method as recited in claim 3 in which the opcode corresponds to an address within the device and in which the device is configured to store each operand at the most recently received address.

5. An interface for controlling a device, the interface comprising:
    a counter configured to form a total by counting a series of rising edges in a serial input;
    a first circuit configured to extract an operand from the total when the total is odd where the operand is numerically equal to the total shifted right by one bit; and
    a second circuit configured to extract an opcode from the total when the total is even where the opcode is numerically equal to the total shifted right by one bit.

6. An interface as recited in claim 5 in which the opcode corresponds to an address within the device and in which the interface is configured to store each operand at the most recently received address.

7. An interface for controlling a device, the interface comprising:
   a counter configured to form a total by counting a series of rising edges in a serial input;
   a register address latch;
   a first circuit configured to store an opcode in the register address latch when the total is even, where the opcode is a quantity equal to the total shifted right by one bit
   a second circuit configured to cause the accumulated count of clock pulses to be stored in a register selected by the contents of the register address latch, when the input signal has been asserted in a logical high condition for a time that exceeds a predetermined timeout value.

* * * * *